United States Patent [19]
Hagi

[11] Patent Number: 5,638,358
[45] Date of Patent: Jun. 10, 1997

[54] PROTECTION SWITCHING SYSTEM HAVING IMPEDANCE MATCHING CIRCUITS

[75] Inventor: Kazuo Hagi, Tokyo, Japan

[73] Assignee: NEC Corporation, Tokyo, Japan

[21] Appl. No.: 429,528

[22] Filed: Apr. 26, 1995

[30] Foreign Application Priority Data

Apr. 27, 1994 [JP] Japan ................................. 6-089328

[51] Int. Cl.$^6$ ................................................. H04J 3/14
[52] U.S. Cl. ................ 370/228; 340/825.01; 395/182.01
[58] Field of Search ........................ 370/13, 13.1, 14, 370/16, 16.1, 54, 55; 340/825.01, 825.02, 825.03, 826, 827; 379/2, 27, 30, 268, 271, 272, 273, 279; 395/180, 181, 182.01, 182.02

[56] References Cited

U.S. PATENT DOCUMENTS

| | | | |
|---|---|---|---|
| 4,497,054 | 1/1985 | Read | 370/16 |
| 5,014,261 | 5/1991 | Shinbashi et al. | 370/16 |
| 5,163,041 | 11/1992 | Moriyama | 370/16 |
| 5,321,393 | 6/1994 | Carlton et al. | 340/825.01 |
| 5,321,394 | 6/1994 | Carlton et al. | 340/825.01 |

*Primary Examiner*—Alpus H. Hsu
*Attorney, Agent, or Firm*—Scully, Scott, Murphy & Presser

[57] ABSTRACT

In a protection switching system for N working transmission systems and a spare transmission system, first to Nth protection switches (11-1~11-n) am provided corresponding respectively to the N working transmission systems (21-1~21-n). Each protection switch includes a forward/backward impedance matching circuit (30, 31) and first, second and third pairs of terminals (c, d; h, i; g, j), the first pair terminals (c, b) of each protection switch (11) being connected to the corresponding working transmission system. The second pair terminals (h, i) of each of the first to (N-1)th protection switches are connected respectively to the third pair terminals (g, J) of the second to Nth protection switches, the second pair terminals (h, 1) of the first protection switch being connected to the spare transmission system (20), and the third Fair terminals (g, j) of the Nth protection switch being connected together. In each protection switch, a first two-way connection (22, 23) is established between the forward/backward impedance matching circuit and the first pair terminals (c, d) and a second two-way connection (24, 25) between the second pair terminals (h, i) and the third pair terminals (g, i) when the corresponding working system is working properly. When the corresponding working system is not working properly, the first two-way connection (22, 23) and the second two-way connection (24, 25) are cleared and a third two-way connection (22a, 23a) is established between the forward/backward matching circuits and the third pair terminals (g, j).

6 Claims, 3 Drawing Sheets

PROTECTION SWITCHING SYSTEM HAVING IMPEDANCE MATCHING CIRCUITS

BACKGROUND OF THE INVENTION

1. Field of the Invention

The present invention relates to protection switching for working transmission systems using a spare transmission system in a hot-standby mode.

2. Description of the Related Art

It is known that a conventional (n+1) protection switching system includes a switching module for establishing "n" two-way connections between corresponding "n" two-way channels and corresponding "n" working transmission systems when each of the working transmission systems is operating properly. When one of the working transmission systems fails, the switching module is controlled to clear the connection between the corresponding channel and the failed working transmission system and a new connection is established between that channel and a spare transmission system. The switching module is an integrated assembly of relays and the like which cannot be individually taken out of the module for repair. If a failure occurs in one of these relays, the whole unit of the module is discarded for replacement with a new switching module. However, this is undesirable from the standpoints of economy and protection of environment. Another disadvantage of the prior art protection switching module is that when a protection switching occurs in the switching module in response to the occurrence of a failure in one of the working transmission systems, relay contacts are directly interposed between the corresponding channel and the spare transmission system, causing a signal loss variation and an impedance variation which result in a lowering of transmission efficiency.

SUMMARY OF THE INVENTION

It is therefore an object of the present invention to provide a protection switching system having a plurality of units which can be replaced individually with new ones in the event of a failure and which introduces no variations in both signal loss and impedance during protection switching.

According to a broader aspect, the present invention provides a protection switching system for use with a plurality of channels, a plurality of working transmission systems and a spare transmission system. The protection switching system comprises a plurality of impedance matching circuits corresponding respectively to the channels, Bach of the impedance matching circuits provides an impedance matched to the characteristic impedance of a channel. A plurality of switch means are provided corresponding respectively to the impedance matching circuits and the working transmission systems, Each of the switch means establishes a first connection between the corresponding impedance matching circuit and the corresponding working transmission system when the corresponding working transmission system is working properly, and clearing the first connection and establishing a second connection between the corresponding matching circuit and the spare transmission system when the corresponding working transmission system is not working property.

According to a second aspect, the present invention provides a protection switching system for N channels, N working transmission systems, and a spare transmission system. The protection switching system comprises N impedance matching circuits corresponding respectively to the N channels. Each of the impedance matching circuits provides an impedance matched to the characteristic impedance of the corresponding channel. First to Nth switch means are provided corresponding respectively to the N working transmission systems, Each of the first to the Nth switch means includes first and second terminals, the first terminal of each of the first to (N−1)th switch means being connected to the second terminal of the second to Nth switch means, the second terminal of the first switch means being connected to the spare transmission system, In each of the first to the Nth switches, a first connection is established between the corresponding impedance matching circuit and the corresponding working transmission system and a second connection between the first terminal and the second terminal when the corresponding working transmission system is working properly. When the corresponding working transmission system Is not working properly, the first connection and the second connection are cleared and a third connection is established between the corresponding impedance matching circuit and the second terminal.

According to a third aspect, the present invention provides a protection switching system for N working transmission systems and a spare transmission system. The protection switching system comprises first to Nth protection switches corresponding respectively to the N working transmission systems. Each of the first to the Nth protection switches Includes a forward/backward Impedance matching circuit, and first, second and third terminals, with the first terminal being connected to the corresponding working transmission system. The second terminal of each of the tint to (N−1)th protection switches is connected to the third terminal of the second to Nth protection switches, and the second terminal of the first protection switch being connected to the spare transmission system. In each of the protection switches, a tint connection is established between the forward/backward Impedance matching circuit and the first terminal and a second connection between the second terminal and the third terminal when the corresponding working system Is working properly. When the corresponding working system is not working properly, the first connection and the second connection are cleared and a third connection is established between the corresponding forward/backward matching circuit and the third terminal

BRIEF DESCRIPTION OF THE DRAWINGS

The present invention will be described in further detail with reference to the accompanying drawings, in which.

DETAILED DESCRIPTION

Figure 1:
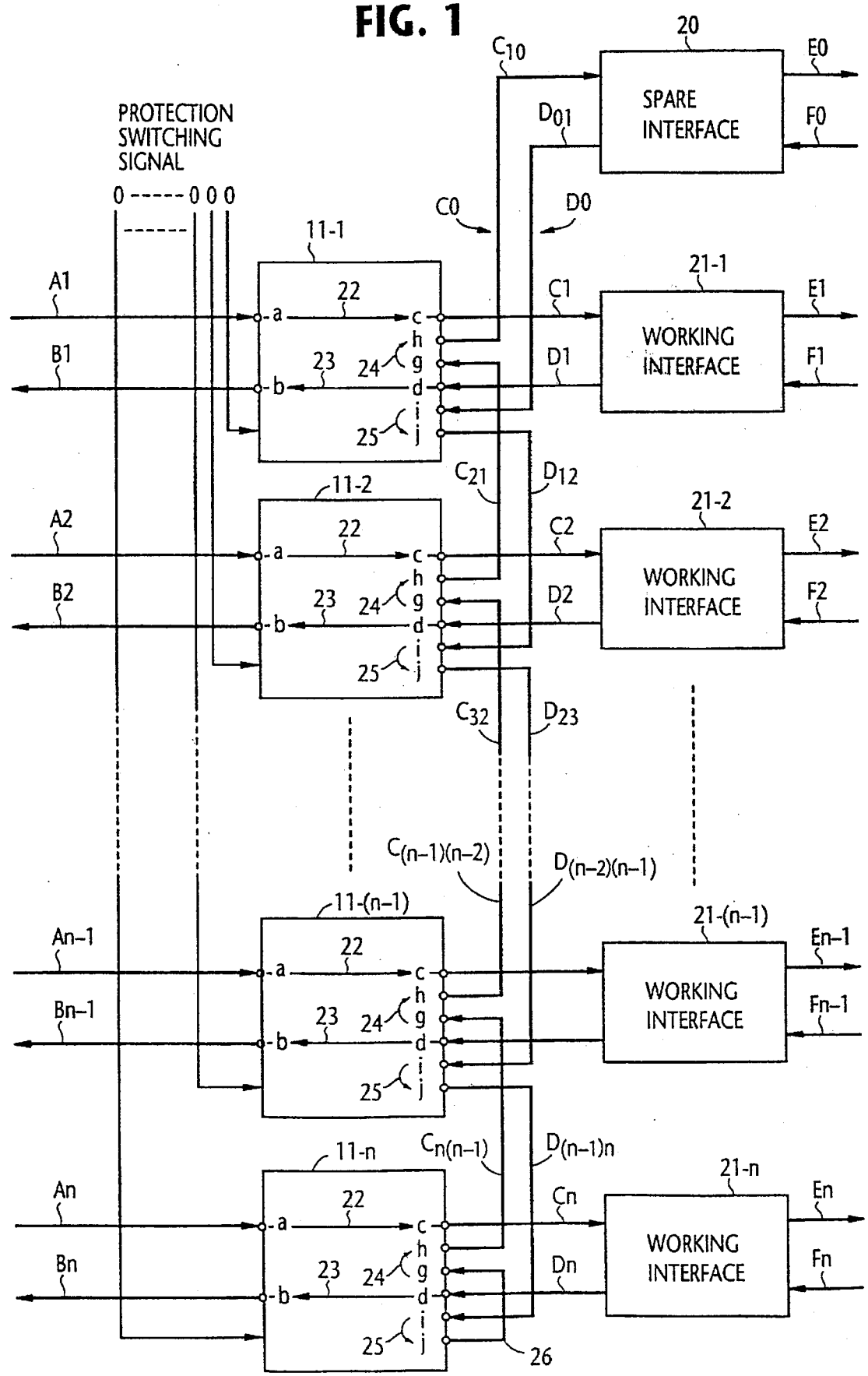
FIG. 1 is a black diagram of a protection switching system according to the present invention, illustrating connections during fault-free, normal operation.

As illustrated in FIG. 1, the (n+1) protection switching system of the present invention comprises a plurality of identical protection switches 11-1, 11-2, ..., 11-(n−1), 11-n, corresponding working interfaces 21-1, 21-2, ..., 21-(n−1), 21-n, and a spare interface 20. To each of the working interfaces 21-k (k=1 to n) is connected a forward working outgoing transmission line Ek and a backward working incoming transmission line Fk to form a working transmission system, and to the spare Interface 20 is connected a forward spare outgoing transmission line E0 and a backward spare incoming transmission line F0 are terminated to form a spare transmission system. The tint to n-th forward (left-to-right) incoming channels A1 through An are terminated at corresponding switches 11-1~11-n. Each protection switch 11 has a forward input terminal "a", a backward output terminal "b", a forward working-line output terminal "c", a backward working-line Input terminal "d", a forward spare-line augur terminal "h", a forward spare-line Input terminal "g", a backward spare-line input terminal "i", and a backward spare-line output terminal "j". Each protection circuit is connected to a control signal source, not shown, to receive a protection switching signal which is at binary 0 when the corresponding working system Is operating properly and at binary 1 when it is not working properly.

During normal operation, signals from the forward incoming channels A1~An are switched through junction lines C1~Cn to corresponding working interfaces 21-1~21-n and thence to the first to n-th forward outgoing lines E1~En. The first to n-th backward (right-to-left) incoming lines F1 through Fn are terminated at corresponding working interfaces 21-1~21-n. Signals from the backward incoming lines F1~Fn are switched through junction lines D1~Dn to corresponding protection switches 11-1~11-n and thence to first to n-th backward outgoing channels B1~Bn. More specifically, in each of the switches 11-1~11-n, switched paths are established as indicated by a path 22 between terminals "a" and "c" In the forward direction and a path 23 between terminals "d" and "b" in the backward direction. In addition, a path 24 is established between terminals "g" and "h" and a path 25 between terminals "i" and "j". The terminal "h" of each protection switch 11-i is connected by a junction line $C_{i(i-1)}$ to the terminal "g" of an adjacent switch 11(i-1) and the terminal "j" of each protection switch 11-i is connected by a junction line $D_{i(i+1)}$ to the terminal "i" of an adjacent switch 11-(i+1). The terminals "h" and "i" of protection switch 11-1 are connected by lines $C_{10}$ and $D_{01}$, respectively, to the spare interface 20, so that, during normal operation, lines $C_{10}$ through $C_{n(n-1)}$ are connected in series to form a forward spare Junction line C0 to the spare interface 20 to allow access thereto from each protection switch and lines $D_{01}$ through $D_{(n-1)n}$ are connected in series to form a backward spare junction line D0 to each protection switch to allow access from the spare interface 20 to any of the protection switches. The "j" and "g" terminals of protection switch 11-n are connected together by a line 26, so that the backward output line D0 is connected to the forward input line C0.

Figure 2:
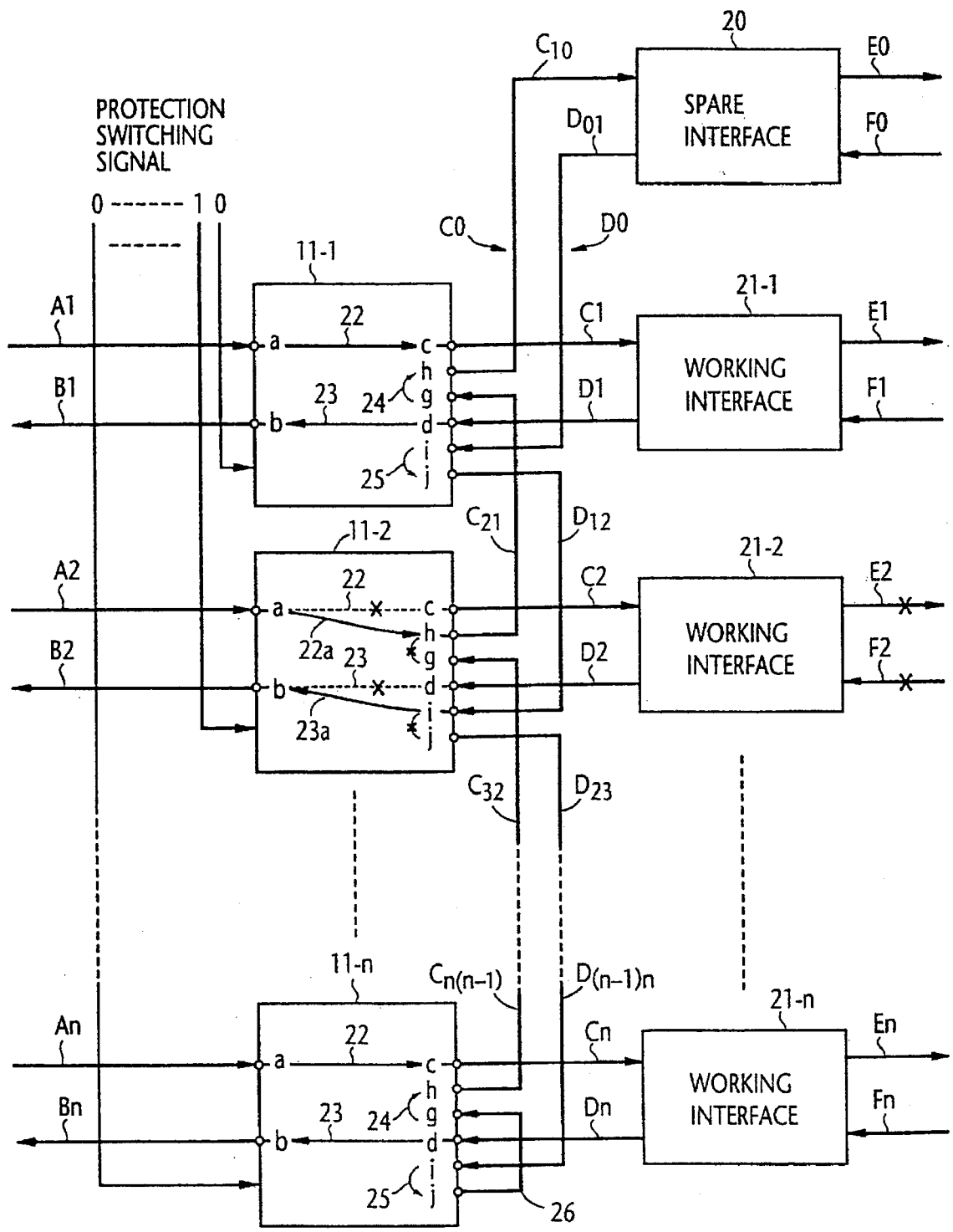
FIG. 2 is a block diagram of the protection switching system of the present invention, illustrating connections when a failure occurs in working transmission lines.

If a failure occurs in any of the transmission lines E1 to En and F1 to Fn or in a corresponding working interface, the spare interface 20 is switched into circuit with one of the protection switches 11-1~11-n which corresponds to the failed transmission lines. As shown in FIG. 2, if a failure occurs in the interface 21-2 or in the transmission lines E2 and F2, for example, paths 22 and 23 in the corresponding protection switch 11-2 are disconnected and a new path 22a is established between terminals "a" and "h" and a new path 23a between terminals "b" and "i" established by disconnecting paths 24 and 25. In this way, the forward incoming line A2 is connected through path 22a and junction lines $C_{12}$ and $C_{01}$ to interface 20, and thence to the forward spare outgoing transmission line E0, and the backward spare incoming transmission line F0 is connected via interface 20 and junction lines $D_{01}$, $D_{12}$ and path 23a to the backward outgoing line B2.

Figure 3:
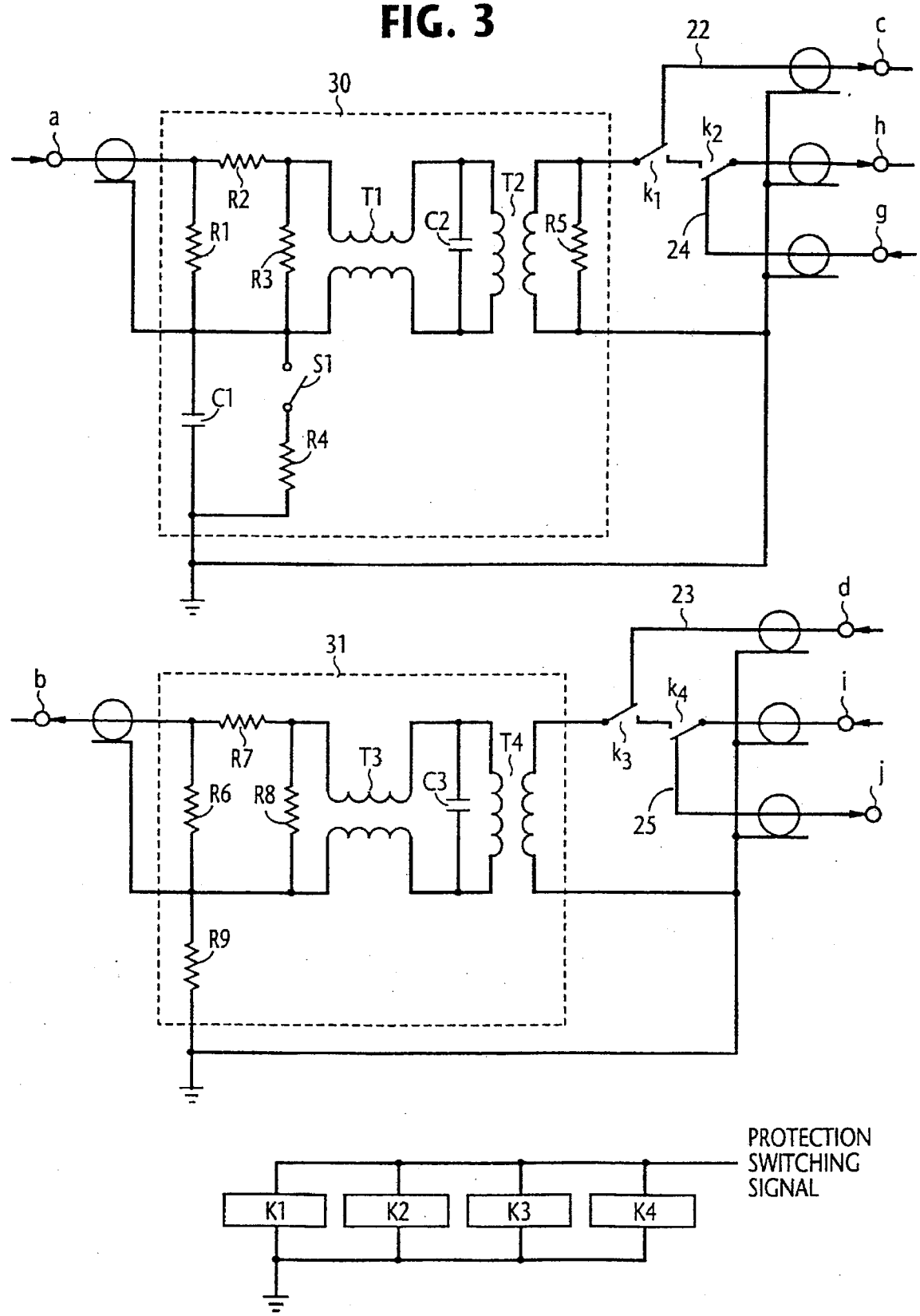
FIG. 3 is a circuit diagram of a protection switch of the present invention.

Details of each of the protection switches 11-1~11-n are shown in FIG. 3. The protection switch 11 comprises a forward impedance matching circuit 30 and a backward impedance matching circuit 31. Relays K1, K2, K3 and K4 are provided to respond to a protection switching signal which is supplied from an external control source, not shown, for simultaneously operating their relay contacts $k_1$, $k_2$, $k_3$ and $k_4$ in the event of a transmission failure. The forward impedance matching circuit 30 of each protection switch 11 is to provide an Impedance that is matched to the characteristic impedance of the corresponding incoming channel A. Specifically, it Includes an attenuator formed by resistors R1, R2, R3 connected to the Input terminal "a" for reducing return loss. A grounding circuit formed by a capacitor C1, a switch S1 and a resistor R4 is connected to the external ground conductor. Switch S1 is used to connect the ground conductor to or disconnect it from ground depending on the level of noise Introduced to the incoming channel. An attenuation matching circuit is formed by a transformer T1 and a capacitor C2 between the R1–R3 attenuator and the primary winding of a DC-decoupling transformer T2. A termination resistor R5 is coupled across the secondary winding of transformer T2. The output signal of the forward impedance matching circuit 30 appears across the termination resistor R5, which is connected to ground at one end. The other end of resistor R5 is connected through relay contact $k_1$ to the terminal "c" to establish the path 22 when relay K1 is not operated. Relay contact $k_2$ is connected between terminals "g" and "h" to establish the path 24 therebetween when relay K2 is not operated.

In a similar manner, the backward impedance matching circuit 31 of each protection switch 11 is to provide an impedance that is matched to the characteristic impedance of the corresponding outgoing channel B, and includes an attenuator (R6, R7, R8) connected to the output terminal "b", an attenuation matching circuit of transformer T3 and capacitor C3 connected to the R6–R8 attenuator and a DC-decoupling transformer T4 whose secondary winding is connected across the capacitor C3 and whose primary winding is connected at one end to ground. The other end of the primary, winding of transformer T4 is connected through relay contact $k_3$ to the terminal "d" to establish the path 23. Relay contact $k_4$ is connected between terminals "i" and "j" to establish the path 25 therebetween when relay K4 is not operated. The external ground conductor that leads to the terminal "b" is grounded by a resistor R9.

When relays K1 to K4 are operated, the paths 22 and 24 are disconnected and the output of backward matching circuit 31 is connected through relay contacts $k_1$ and $k_2$ to the terminal "h". Further, the paths 23 and 25 are disconnected and the terminal "i" is connected through relay contacts $k_4$ and $k_3$ to the input of backward matching circuit 31.

What is claimed is:

1. A protection switching system for a plurality of channels, a plurality of working transmission systems, and a spare transmission system, comprising:

a plurality of impedance matching circuits corresponding respectively to said channels, each of the impedance matching circuits providing an impedance matched to the characteristic impedance of the corresponding channel; and a plurality of switch means corresponding respectively to said matching circuits and said working transmission systems, each said switch means having first and second terminals, said first terminal being connected to said corresponding working transmission system and said second terminal being connected to said spare transmission system, each said switch means establishing a first connection between the corresponding matching circuit and the first terminal when the corresponding working transmission system is working properly, and clearing the first connection and establishing a second connection between the corresponding matching circuit and the second terminal when the corresponding working transmission system is not working properly, wherein said impedance matching circuits and the corresponding switch means are provided in individual replaceable units corresponding respectively to said working transmission systems and said channels.

2. A protection switching system for N channels, N working transmission systems, and a spare transmission system, comprising:

N impedance matching circuits corresponding respectively to said N channels, each of the impedance matching circuits providing an impedance matched to the characteristic impedance of the corresponding channel; and first to Nth switch means corresponding respectively to said N working transmission systems, each of the first to the Nth switch means comprising:

first and second terminals, the first terminal of each of the first to (N−1)th switch means being connected respectively to the second terminal (h, i) of the second to Nth switch means, the second terminal of the first switch means being connected to said spare transmission system; and means for establishing a first connection between the corresponding impedance matching circuit and the corresponding working transmission system and a second connection between the first terminal and the second terminal when the corresponding working transmission system is working properly, and clearing the first connection and the second connection and establishing a third connection between the corresponding impedance matching circuit and the second terminal when the corresponding working transmission system is not working properly.

3. A protection switching system for N working transmission systems and a spare transmission system, comprising:

first to Nth protection switches corresponding respectively to said N working transmission systems, each of the first to the Nth protection switches comprising:

an impedance matching circuit for providing an impedance matched to the characteristic impedance of an incoming channel; and first, second and third terminals, the first terminal being connected to the corresponding working transmission system, the second terminal of each of the first to (N−1)th protection switches being connected respectively to the third terminal of the second to Nth protection switches, the second terminal of the first protection switch being connected to said spare transmission system;

switch means for establishing a first connection between the impedance matching circuit and the first pair terminals and a second connection between the second terminal and the third terminal when the corresponding working system is working properly, and clearing the first connection and the second connection and establishing a third connection between the forward/backward matching circuits and the third terminal when the corresponding working system is not working properly.

4. A protection switching system for a plurality of two-way channels, a plurality of two-way working transmission systems, and a two-way spare transmission system, comprising:

a plurality of two-way impedance matching circuits corresponding respectively to the two-way channels, each of the two-way impedance matching circuits providing an impedance matched to the characteristic impedance of the corresponding two-way channel; and a plurality of switch means corresponding respectively to said two-way matching circuits and said two-way working transmission systems, each said switch means having a first pair of terminals connected to said corresponding two-way working transmission system and a second pair of terminals connected to said two-way spare transmission system, each of said switch means establishing a first two-way connection between the corresponding two-way matching circuit and the first pair of terminals when the corresponding working transmission system is working properly, and clearing the first two-way connection and establishing a second two-way connection between the corresponding two-way matching circuit and the second pair of terminals when the corresponding working transmission system is not working properly, wherein said two-way impedance matching circuits and the corresponding switch means are provided in individual replaceable units corresponding respectively to said two-way working transmission systems and said two-way channels.

5. A protection switching system for N two-way channels, N two-way working transmission systems, and a two-way spare transmission system, comprising:

N two-way impedance matching circuits corresponding respectively to said N two-way channels, each of the two-way matching circuits providing an impedance matched to the characteristic impedance of the corresponding two-way channel; and first to Nth switch means corresponding respectively to said N working transmission systems, each of the first to the Nth switch means comprising:

first and second pairs of terminals the first pair terminals of each of the first to (N−1)th switch means being connected respectively to the second pair terminals of the second to Nth switch means, the second pair terminals of the first switch means being connected to said spare transmission system, and the first pair terminals of the Nth switch means being connected together; and means for establishing a first two-way connection between the corresponding two-way impedance matching circuit and the corresponding two-way working transmission system and a second two-way connection between the first pair terminals and the second pair terminals when the corresponding two-way working transmission system is working properly, and clearing the first two-way connection and the second two-way connection and establishing a third two-way connection between the corresponding two-way impedance matching circuit and the second pair terminals when the corresponding two-way working transmission system is not working properly.

6. A protection switching system for N working transmission systems and a spare transmission system, comprising:

first to Nth protection switches corresponding respectively to said N working transmission systems, each of the first to the Nth protection switches comprising:

a forward/backward impedance matching circuit for providing an impedance matched to the characteristic impedance of an incoming channel and an impedance matched to the characteristic impedance of an outgoing channel;

first, second and third pairs of terminals, the first pair terminals being connected to the corresponding working transmission system, the second pair terminals of each of the first to (N−1)th protection switches being connected respectively to the third pair terminals of the first protection switch being connected to said spare transmission system, and the third pair terminals of the Nth protection switch being connected together; and switch means for establishing a first twoway connection between the forward/backward impedance matching circuit and the first pair terminals and a second two-way connection between the second pair terminals and the third pair terminals when the corresponding working system is working properly, and clearing the first two-way connection and the second two-way connection and establishing a third two-way connection between the forward/backward matching circuits and the third pair terminals when the corresponding working system is not working properly.

* * * * *

UNITED STATES PATENT AND TRADEMARK OFFICE
CERTIFICATE OF CORRECTION

PATENT NO. : 5,638,358

DATED : June 10, 1997

INVENTOR(S) : Kazuo Hagi

It is certified that error appears in the above-identified patent and that said Letters Patent are hereby corrected as shown below:

In the Abstract, line 3: "am" should read --are--

Column 2, lines 30 & 35: "tint" should read --first--

Column 3, line 3: "tint" should read --first--

Column 3, line 9: "augur" should read --output--

Column 3, line 34: "11(i-1)" should read --11-(i-1)--

Column 8, line 1, Claim 6: "twoway" should read --two-way--

Signed and Sealed this

Nineteenth Day of May, 1998

Attest:

*Attesting Officer*

BRUCE LEHMAN

*Commissioner of Patents and Trademarks*